(12) United States Patent
Samie et al.

(10) Patent No.: US 10,465,756 B2
(45) Date of Patent: Nov. 5, 2019

(54) SELECTABLE TORQUE TRANSFER MECHANISMS FOR A VEHICLE TRANSMISSION

(71) Applicant: GM GLOBAL TECHNOLOGY OPERATIONS LLC, Detroit, MI (US)

(72) Inventors: Farzad Samie, Franklin, MI (US); Tito R. Huffman, Eastpointe, MI (US); Chunhao J. Lee, Troy, MI (US)

(73) Assignee: GM Global Technologies Operations LLC, Detroit, MI (US)

( * ) Notice: Subject to any disclaimer, the term of this patent is extended or adjusted under 35 U.S.C. 154(b) by 340 days.

(21) Appl. No.: 15/196,547

(22) Filed: Jun. 29, 2016

(65) Prior Publication Data
US 2018/0003247 A1 Jan. 4, 2018

(51) Int. Cl.
F16D 28/00 (2006.01)
F16D 41/16 (2006.01)
F16D 41/12 (2006.01)

(52) U.S. Cl.
CPC ............ F16D 41/16 (2013.01); F16D 28/00 (2013.01); F16D 41/125 (2013.01)

(58) Field of Classification Search
CPC ........... F16D 41/16; F16D 41/25; F16D 28/00
See application file for complete search history.

(56) References Cited

U.S. PATENT DOCUMENTS

| | | | | |
|---|---|---|---|---|
| 6,568,517 B2* | 5/2003 | Le-Calve | ............... | F16D 41/185 192/45.1 |
| 7,198,587 B2 | 4/2007 | Samie et al. | | |
| 7,992,695 B2* | 8/2011 | Wittkopp | ................ | F16D 25/00 192/41 R |
| 8,061,496 B2* | 11/2011 | Samie | ..................... | F16D 41/08 192/43 |
| 8,287,411 B2 | 10/2012 | Lee et al. | | |
| 8,296,020 B2 | 10/2012 | Lee et al. | | |
| 8,409,053 B2 | 4/2013 | Samie et al. | | |
| 8,454,466 B2 | 6/2013 | Samie et al. | | |
| 8,469,847 B2 | 6/2013 | Lee et al. | | |
| 8,540,065 B2 | 9/2013 | Samie et al. | | |
| 8,602,187 B2* | 12/2013 | Prout | ..................... | F16D 41/125 192/43.1 |
| 8,646,587 B2* | 2/2014 | Kimes | .................... | F16D 41/125 192/46 |
| 10,066,682 B2* | 9/2018 | Shioiri | ..................... | F16D 23/12 |

* cited by examiner

*Primary Examiner* — David J Hlavka
(74) *Attorney, Agent, or Firm* — Quinn IP Law

(57) ABSTRACT

A selectable torque transfer system includes an input member to receive an input torque, and an output member that is selectively coupled to the input member. The selectable torque transfer system also includes an engaging member disposed between the input member and the output member and a biasing element configured to urge the engaging member towards a first position. The selectable torque transfer system further includes an electrically-powered solenoid configured to actuate the engaging member to a second position thereby enabling torque transfer from the input member to the output member.

20 Claims, 4 Drawing Sheets

SELECTABLE TORQUE TRANSFER MECHANISMS FOR A VEHICLE TRANSMISSION

TECHNICAL FIELD

The present disclosure relates to a vehicle powertrain transmission having selectable torque transfer modes.

INTRODUCTION

A vehicle powertrain may include a torque generating propulsion source to spin an output shaft. Powertrains may also include one or more gear sets to transfer torque output from the propulsion source to the vehicle wheels. The gear sets may provide multiple output ratios based on actuating one or more clutches or other internal components to influence the powertrain output.

SUMMARY

A selectable torque transfer system includes an input member to receive an input torque, and an output member that is selectively coupled to the input member. The selectable torque transfer system also includes an engaging member disposed between the input member and the output member and a biasing element configured to urge the engaging member towards a first position. The selectable torque transfer system further includes an electrically-powered solenoid configured to actuate the engaging member to a second position thereby enabling torque transfer from the input member to the output member.

A propulsion system includes a transmission having a plurality of gear elements to convert a first input torque into a second output torque. The propulsion system also includes at least one selectable torque transfer element disposed within the transmission to selectively decouple a torque flow from the first input torque to the second output torque. An electrically-powered solenoid is configured to actuate the at least one selectable torque transfer element to engage at least one gear element when energized. The propulsion system further includes at least one biasing element to bias the selectable torque element to decouple torque flow when the solenoid is de-energized.

A propulsion system includes a transmission having a plurality of gear elements to convert a first input torque into a second output torque. The propulsion system also includes an input member to receive an input torque from a propulsion source and an engaging member configured to selectably actuate to control a transfer of the input torque to an output member. The propulsion system further includes a biasing element configured to urge the engaging member towards one of a first position and a second position. An electrically-powered solenoid is configured to actuate the engaging member to the other of the first position and the second position enabling torque transfer from the input member to the output member.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A vehicle powertrain transmission may receive input torque from a propulsion source such as an engine or electric motor, or both together, for example. The transmission may then transmit the torque to an output location such as a driveline to propel vehicle wheels. The transmission may include one or more selectable torque transfer elements which influence the particular mode of torque transfer. In some examples, a friction clutch may selectively transfer torque when pressure is applied to couple at least one driving input plate with one more driven output plates. When the pressure is released, the plates are decoupled thereby allowing relative rotational slip between the input plates and the output plates. Such friction disc clutch arrangements may impart significant drag during transitioning states as well as during a fully decoupled state.

Other coupling mechanisms may include, for example, a positive clutch arrangement having more discrete coupled and decoupled states without slipping transition states. Reduction in drag may contribute to improved fuel economy, and/or greater electric range for electrically propelled vehicles. In one example, a positive clutch arrangement may include articulating elements which restrict rotation in a first rotation direction in order to transfer torque, and at the same time allow relative rotation in a second rotation direction in order to provide relative slip between input and output components. A selectable one-way clutch permits rotation in a free-wheeling first direction and is rotationally fixed to restrict rotation in a locked second direction of rotation. In further examples, it may be desirable to provide braking to one or more internal gears to influence the mode of torque transfer through the transmission, such as with a planetary gear set configuration for example.

Figure 1:
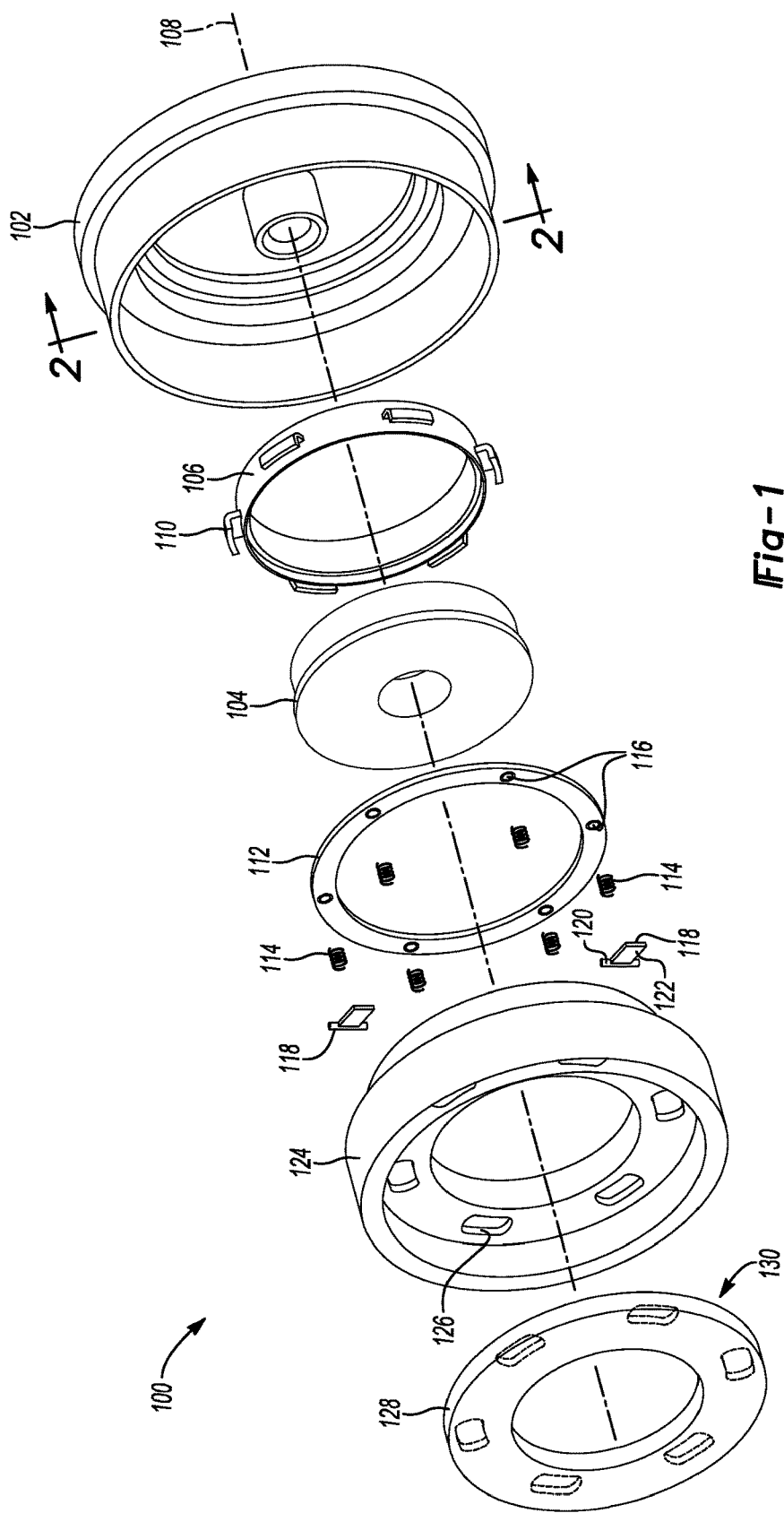
FIG. 1 is an exploded view of a selectable torque transfer assembly.
Figure 2A:
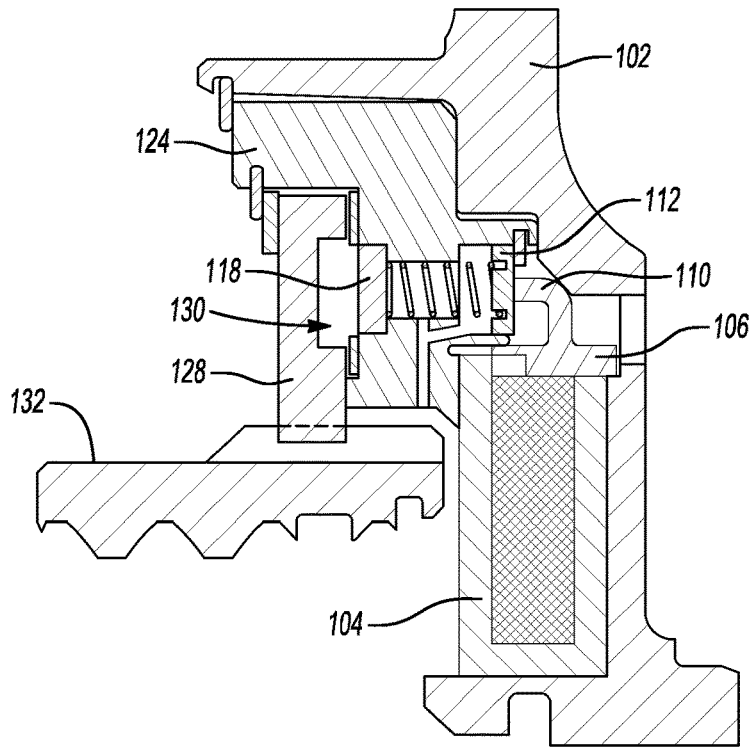
FIG. 2A is cross-sectional view along line 2-2 of the selectable torque transfer assembly of FIG. 1 in a non-actuated first position.
Figure 2B:
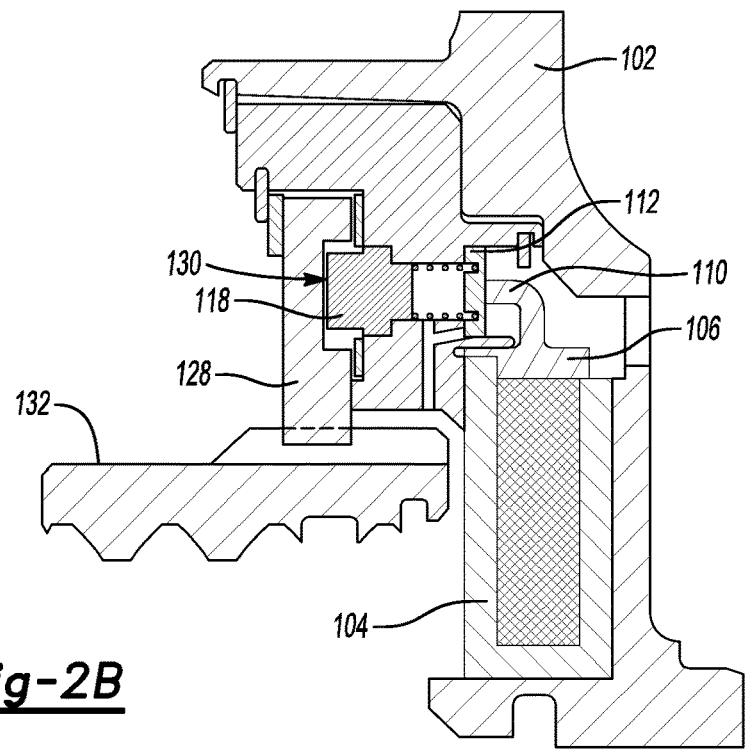
FIG. 2B is cross-sectional view along line 2-2 of the selectable torque transfer assembly of FIG. 1 in an actuated second position.

Referring collectively to FIG. 1, FIG. 2A, and FIG. 2B a selectable torque transfer system 100 enables multiple operation modes having different torque transfer properties.

An input member 102 is arranged to receive an input torque from an upstream torque element in the propulsion system. In one example the input member receives torque from a petrol engine as a propulsion source. The clutch assembly 100 operates as a selectable torque transfer mechanism capable of providing multiple different torque transfer modes.

The torque transfer system 100 includes an actuating component to engage and disengage the one or more torque transfer modes. Electrically-powered solenoid 104 is configured to actuate an engaging element 106 generally along an axis of rotation 108. The solenoid 104 is connected to a power source (not shown) and provides linear actuation. In response to being energized, the solenoid 104 provides an actuation force to stroke the engaging member 106 which is affixed to an actuating portion of the solenoid 104. In the example provided, the engaging member 106 defines a generally annular shape that extends about an external portion of the solenoid 104. The engaging member 106 also includes a plurality of plunger elements 110 extending from a main body. The plunger elements 110 extend in axial direction generally parallel to the direction of actuation of the solenoid.

The solenoid 104 and engaging member 106 are arranged to define a first non-actuated position, and a second actuated position. Each of the plunger elements 110 are in contact with a spring plate 112. The spring plate 112 is biased against the direction of actuation of the solenoid by the plurality of biasing elements 114. The spring plate 112 may include a number of receiving features 116 to secure a location of each of the biasing elements 114. In one example, the receiving features are circular grooves configured to receive coil springs. When the spring plate 112 is actuated, force is transferred through each of the biasing elements 114 to actuate a corresponding strut member 118. Each of the strut members 118 may be pivotable about an integral post 120 and includes a tab portion 122 that is actuated by force received from a corresponding biasing element 114. Each of the strut members 118 may also include a return spring (not shown) to retract a corresponding strut to a non-actuated position when the engaging member 106 is in the non-actuated first position. While two pairs of biasing elements 114 and strut members 118 are depicted for illustrative purposes, the number of strut-spring pairs may correspond to the number of plunger elements 110 that extend from the engaging member 106. In alternative examples the struts may be linearly-actuating members as opposed to pivoting members.

A retaining pocket plate 124 is coupled to the input member 102 and defines an internal pocket to house the components of the selectable clutch engagement mechanism. The retaining pocket plate 124 also includes a number of ports 126 that allow the struts 118 to protrude through the pocket plate 124 when the solenoid 104 is actuated. More specifically, the tab portion 122 may be pivoted about the integral post 120 due to force from the biasing member such that each respective tab portions 122 extends through to an opposing side of the retaining pocket plate.

As described above, each of the struts 118 may also include a return spring (not shown) to cause the struts to retract to a non-actuated position when not under load. Specifically, when the engaging member 106 is in the non-actuated first position, the struts 118 are retracted such that they do not protrude through the retaining pocket member 124. In this way, multi-direction relative rotation is allowed between the input member 102 and an output member 128. The output member 128 may be coupled to other rotating elements that are downstream in a torque flow of the propulsion system. In one example, the output member 128 is affixed to an output shaft 132. The output member 128 may also include a number of notches 130 each configured to receive the tab portion 122 of a strut 118 when the strut is rotated. In one example, each notch 130 is angled corresponding to a direction of rotation to provide inclined ramped surfaces such that each of the struts 118 is allowed to traverse a ramped surface as the input member rotates relative to the output member. Sufficient resistive torque of the output member causes the ramped surfaces to deflect the strut members in a direction of retraction and allows relative slip between the input member 102 and the output member 128 in a first direction of rotation. In a second direction of rotation, a distal end of one or more of the struts 118 engages an edge of a corresponding notch 130 and prevents relative rotation between the input member 102 and the output member 128 thereby transferring torque. In other examples, the extension of each strut 118 engaging the output member 128 prevents relative rotation between the input member and the output member in both the first direction of rotation and the second direction of rotation without the use of ramped surfaces. In such examples restricting rotation in multiple directions, actuation of the engaging member causes a braking torque to at least one of the movable elements of the torque transfer system 100.

Once torque is applied while the struts 118 are extended, there is sufficient circumferential load between the struts and a side wall of the notches 130 such that the struts 118 remain extended even when the solenoid is de-energized and force from the biasing members 114 is released. Once the torque is released between the input member and the output member, the return spring may cause each of the struts 118 to retract back to the non-actuated position. The retraction of the struts allows relative rotation between the input member and the output member in both of the first direction of rotation as well as the second direction of rotation.

Figure 3:
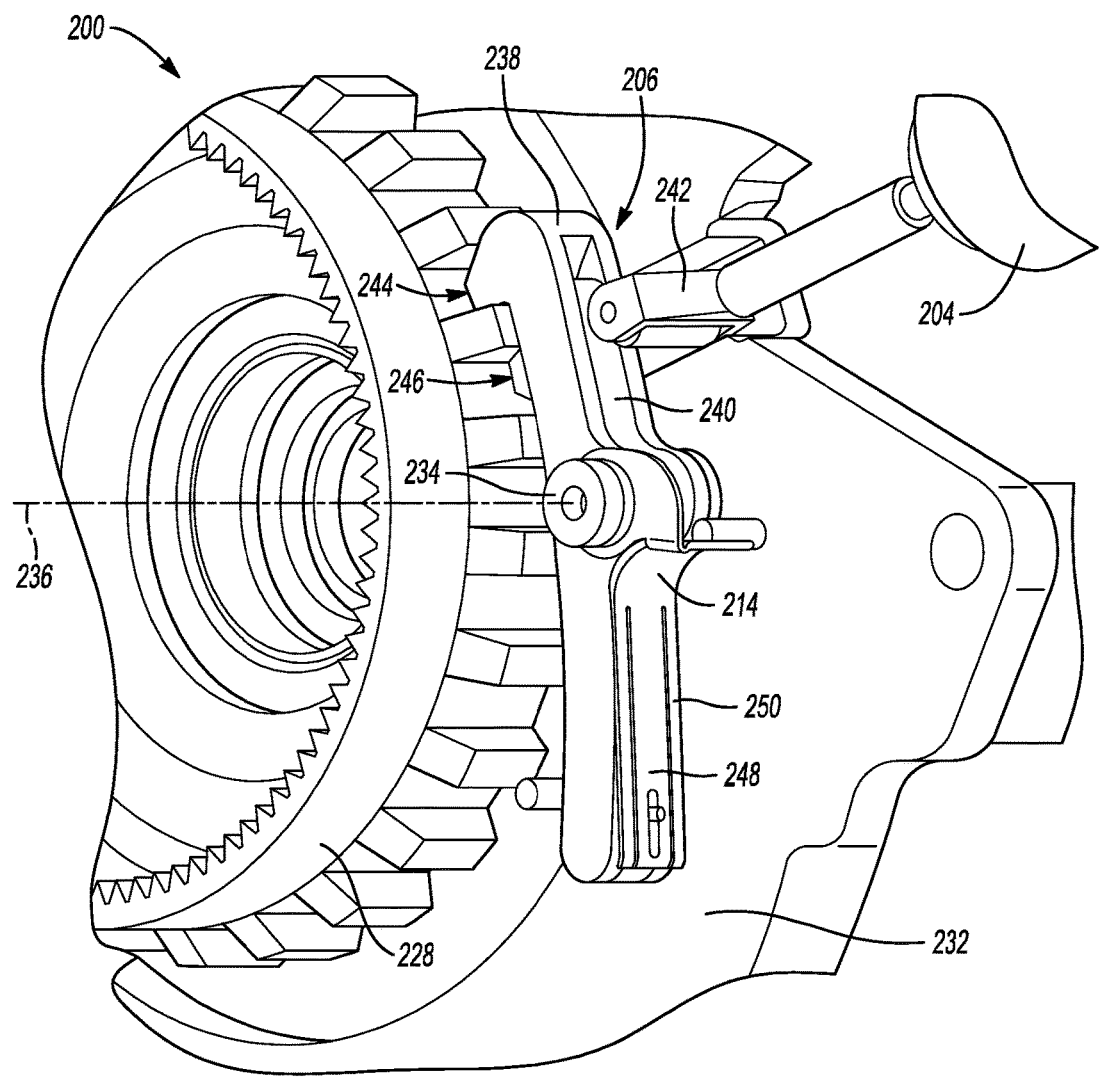
FIG. 3 is a partial cutaway view of an alternate selectable torque transfer assembly in an actuated second position.
Figure 4A:
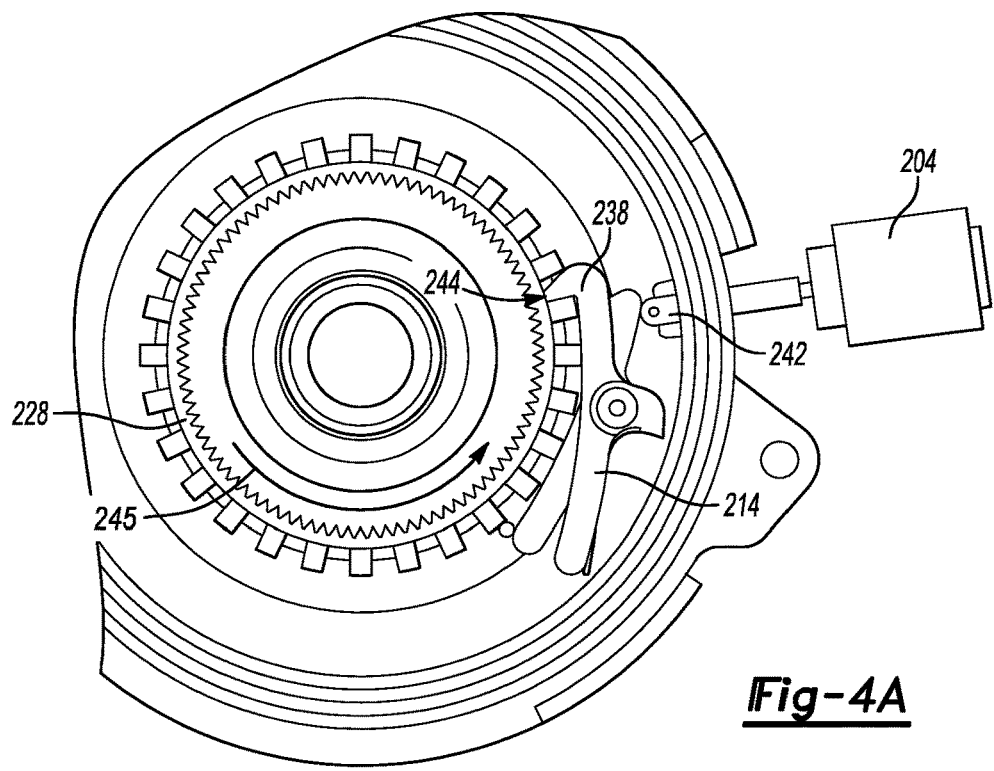
FIG. 4A is a partial cutaway view of the selectable torque transfer assembly of FIG. 3 having a first pawl engaged.
Figure 4B:
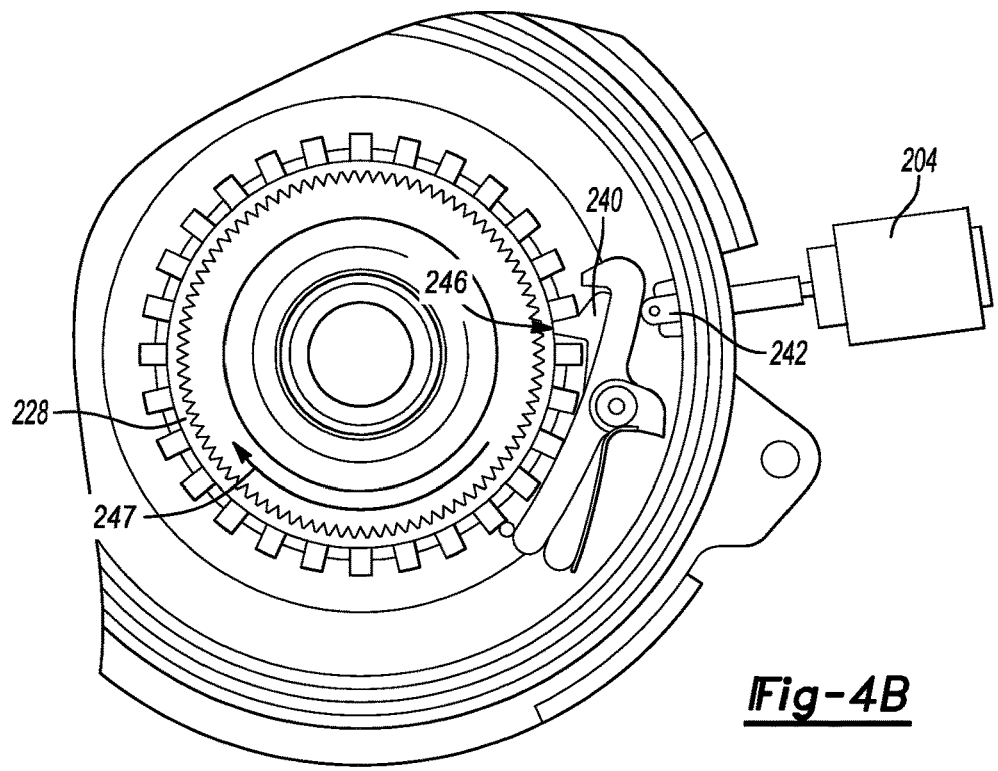
FIG. 4B is a partial cutaway view of the selectable torque transfer assembly of FIG. 3 having a second pawl engaged.

Referring collectively to FIG. 3, FIG. 4A and FIG. 4B, an alternative example of a selectable torque transfer system 200 includes an external configuration having a generally radial actuation of an engaging member 206 to influence rotation of internal transmission components. The engaging member 206 comprises a double pawl configuration. A stationary portion 232 of the transmission includes a mounting 234 which allows the engaging member 206 to pivot about axis 236. The selectable torque transfer system 200 is a braking type clutch to restrict movement of the output member 228. In this example, actuation of the engaging member causes a braking torque to at least one of the plurality of gear elements of the transmission.

A first pawl 238 and a second pawl 240 each are each independently pivotable about the mounting 234. An electrically-powered solenoid 204 is configured to actuate the engaging member. The solenoid 204 includes a plunger 242 arranged to contact both of the first pawl 238 and the second pawl 240 to cause a pivoting to such that the engaging member 206 engages an output member 228. Each of the first pawl 238 and the second pawl 240 includes a detent portion 244, 246 respectively, to engage one or more teeth of the output member 228.

A biasing element 214 is configured to urge the engaging member 206 towards a retracted first position. In the example provided, the biasing element 214 is a torsion return spring having a first split portion 250 corresponding to the first pawl 238 and a second split portion 248 corresponding to the second pawl 240. The split configuration of the biasing element 214 allows each of the first pawl 238 and the second pawl 240 to be independently retracted to the first disengaged position.

Both of the detent portion 244 and the detent portion 246 include a ramped side and an opposing hooked side to restrict a direction of rotation of the output member 228. Each of the different detent portions 244, 246 are shaped in opposing directions to separately restrict different directions of rotation. More specifically, the detent portion 244 of the first pawl 238 restricts rotation of the output member 228 in a first direction denoted by arrow 245. Similarly, the detent portion 246 of the second pawl 240 restricts rotation of the output member 228 in a second direction denoted by arrow 247.

Once the solenoid is de-energized, the plunger 242 retracts allowing the biasing element 214 to cause the engaging element to return to the disengaged first position. However if torque is applied at the output member 228 when the solenoid 204 is de-energized, one of the pawls remains engaged due to friction between the hooked side of a detent portion and a sidewall of one of the teeth of the output member 228. With specific reference to FIG. 4A, if torque is applied to the output member 228 in the first direction 245 when the solenoid 204 is de-energized, the first pawl 238 remains engaged with the output member 228 while the second pawl 240 is allowed to retract with the solenoid plunger 242. The first pawl 238 remains engaged so long as torque in the first direction 245 remains present. Once the torque is released or the direction reversed, the first pawl 238 is retracted due to a return force from the biasing element 214.

In contrast, and in reference to FIG. 4B, if torque is applied to the output member 228 in the second direction 247 when the solenoid 204 is de-energized, the second pawl 240 remains engaged with the output member 228 while the first pawl 238 is allowed to retract with the solenoid plunger 242. The second pawl 240 remains engaged with the output member 228 so long as torque in the second direction 247 remains present. Each of the first pawl 238 and the second pawl 240 independently disengage from the output member 228 when the solenoid 204 is de-energized based on a direction of torque of the output member 228.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A selectable torque transfer system comprising:
an input member to receive an input torque;
an output member selectively coupled to the input member, and the output member defines a space;
an engaging member disposed between the input member and the output member, and the engaging member includes a first portion that extends in a first orientation and a second portion that extends in a second orientation different from the first orientation, and the second portion presents a distal end spaced from the first portion;
wherein the first and second portions of the engaging member are fixed to each other such that the first and second portions are movable together as a unit;
wherein the space of the output member and the distal end of the second portion of the engaging member face each other;
a biasing element configured to urge the engaging member towards one of a first position and a second position; and
an electrically-powered solenoid configured to actuate the engaging member to the other of the first position and the second position thereby enabling torque transfer from the input member to the output member.

2. The selectable torque transfer system of claim 1 wherein the engaging member includes at least one plunger extending therefrom, each plunger defining a terminal portion configured to force a strut into the space of the output member to transfer torque applied from the input member, and wherein the plunger includes the first and second portions, and the second portion defines the terminal portion.

3. The selectable torque transfer system of claim 1 further comprising a plurality of movable struts that are actuated by the engaging member to engage the output member.

4. The selectable torque transfer system of claim 3 wherein the struts allow relative rotation between the input member and the output member in a single direction when actuated.

5. The selectable torque transfer system of claim 3 wherein the struts are configured to remain engaged with the output member after the solenoid is de-energized as long as the input torque is applied, and further configured to retract when the input torque is no longer present.

6. The selectable torque transfer system of claim 1 wherein the engaging member includes at least one pawl pivotally actuated by the solenoid, and wherein the pawl includes the first and second portions.

7. The selectable torque transfer system of claim 6 wherein the at least one pawl includes a first pawl arranged to prevent rotation of the output member in a first direction and a second pawl arranged to prevent rotation of the output member in a second direction when the engaging member is actuated by the solenoid.

8. The selectable torque transfer system of claim 1 which is configured to be utilized in a propulsion system comprising:
a transmission having a plurality of gear elements to convert a first input torque into a second output torque;
at least one selectable torque transfer element disposed within the transmission to selectively decouple a torque flow from the first input torque to the second output torque;
wherein the electrically-powered solenoid is configured to actuate the at least one selectable torque transfer element to engage at least one gear element when energized; and wherein the biasing element is further defined as at least one biasing element, and wherein the at least one biasing element is configured to bias the at least one selectable torque transfer element to decouple torque flow when the solenoid is de-energized.

9. The selectable torque transfer system of claim 8 wherein the at least one selectable torque transfer element includes a plurality of pivotable strut members that are capable of being actuated by the solenoid to engage the output member to allow torque flow through the transmission.

10. The selectable torque transfer system of claim 9 wherein the strut members are configured to remain engaged with the output member after the solenoid is de-energized as long as the first input torque is applied, and further configured to retract when the first input torque is no longer present.

11. The selectable torque transfer system of claim 8:
wherein the at least one selectable torque transfer element includes a first pawl arranged to prevent flow of a first direction of torque and a second pawl arranged to prevent flow of a second direction of torque when the at least one selectable torque transfer element is actuated by the solenoid;
wherein each of the first pawl and the second pawl independently disengages the output member when the solenoid is de-energized based on a direction of torque of the output member; and
wherein the first pawl or the second pawl include the first and second portions.

12. The selectable torque transfer system of claim 1 which is configured to be utilized in a propulsion system comprising:
a transmission having a plurality of gear elements to convert a first input torque into a second output torque;
wherein the input member receives the input torque from a propulsion source; and
wherein the engaging member is configured to selectably actuate to control a transfer of the input torque to the output member;
wherein the biasing element is configured to urge the engaging member towards the first position; and
wherein the electrically-powered solenoid is configured to actuate the engaging member to the second position.

13. The selectable torque transfer system of claim 12 wherein the engaging member includes at least one pawl pivotally actuated by the solenoid, and wherein the pawl includes the first and second portions.

14. The selectable torque transfer system of claim 13 wherein the at least one pawl includes a first pawl arranged to prevent rotation of the output member in a first direction and a second pawl arranged to prevent rotation of the output member in a second direction when the engaging member is actuated by the solenoid.

15. The selectable torque transfer system of claim 14 wherein each of the first pawl and the second pawl define a detent portion having a ramped side and an opposing hooked side.

16. The selectable torque transfer system of claim 12 wherein actuation of the engaging member causes a braking torque to at least one of the plurality of gear elements of the transmission.

17. The selectable torque transfer system of claim 12:
further comprising a plurality of movable struts that are actuated by the engaging member to engage the output member;
wherein the biasing element is further defined as a plurality of biasing elements;
wherein the engaging member includes a plurality of plungers extending therefrom, and the plungers each include the first and second portions; and
wherein each of the biasing elements is disposed axially between a respective one of the struts and the second portion of a respective one of the plungers.

18. The selectable torque transfer system of claim 17 wherein the struts are configured to remain engaged with the output member after the solenoid is de-energized as long as the input torque is applied, and further configured to retract when the input torque is released.

19. The selectable torque transfer system of claim 17 wherein the output member defines a plurality of pockets each configured to receive one of the movable struts, each of the plurality of pockets including a ramped surface causing a respective one of the movable struts to retract when resistive torque greater than a first threshold is applied in a first direction of rotation thereby allowing relative slip between the input member and the output member in the first direction.

20. A selectable torque transfer system comprising:
an input member to receive an input torque;
an output member selectively coupled to the input member;
an engaging member disposed between the input member and the output member;
a biasing element configured to urge the engaging member towards one of a first position and a second position;
an electrically-powered solenoid configured to actuate the engaging member to the other of the first position and the second position thereby enabling torque transfer from the input member to the output member;
a plurality of movable struts that are actuated by the engaging member to engage the output member; and
wherein the struts are configured to remain engaged with the output member after the solenoid is de-energized as long as the input torque is applied, and further configured to retract when the input torque is no longer present.

* * * * *